(12) United States Patent
Englaender

(10) Patent No.: US 8,814,542 B2
(45) Date of Patent: Aug. 26, 2014

(54) VACUUM PUMP

(75) Inventor: Heinrich Englaender, Linnich (DE)

(73) Assignee: Oerlikon Leybold Vacuum GmbH, Cologne (DE)

( * ) Notice: Subject to any disclaimer, the term of this patent is extended or adjusted under 35 U.S.C. 154(b) by 508 days.

(21) Appl. No.: 13/055,977

(22) PCT Filed: May 29, 2009

(86) PCT No.: PCT/EP2009/056645
§ 371 (c)(1),
(2), (4) Date: Jan. 26, 2011

(87) PCT Pub. No.: WO2010/012526
PCT Pub. Date: Feb. 4, 2010

(65) Prior Publication Data
US 2011/0123358 A1    May 26, 2011

(30) Foreign Application Priority Data
Jul. 31, 2008   (DE) .................... 10 2008 035 891

(51) Int. Cl.
*F04D 19/04* (2006.01)
*F04D 29/048* (2006.01)
*F04D 29/058* (2006.01)

(52) U.S. Cl.
CPC ............ *F04D 19/048* (2013.01); *F04D 29/048* (2013.01); *F04D 29/058* (2013.01)
USPC .................................................... 417/423.4

(58) Field of Classification Search
CPC .... F04D 29/048; F04D 29/058; F04D 19/048
USPC ............ 417/423.4, 423.12; 416/174; 415/90, 415/229
See application file for complete search history.

(56) References Cited

U.S. PATENT DOCUMENTS

| | | | | |
|---|---|---|---|---|
| 3,536,418 A | * | 10/1970 | Breaux | 417/49 |
| 5,166,566 A | * | 11/1992 | Bernhardt et al. | 310/90.5 |
| 5,501,583 A | | 3/1996 | Nagaoka et al. | |
| 5,547,338 A | | 8/1996 | Conrad et al. | |
| 6,465,924 B1 | | 10/2002 | Maejima | |
| 6,833,643 B2 | | 12/2004 | Beyer | |
| 2005/0025640 A1 | | 2/2005 | Sekiguchi | |
| 2008/0138202 A1 | | 6/2008 | Eilers | |

FOREIGN PATENT DOCUMENTS

| | | |
|---|---|---|
| DE | 4410656 A1 | 9/1995 |
| DE | 10022061 A1 | 11/2001 |
| DE | 202005019644 U1 | 5/2007 |
| EP | 1574719 A2 | 9/2005 |
| EP | 1890041 B1 | 2/2008 |
| JP | 50-38811 | 4/1975 |
| JP | 59-101596 | 6/1984 |

(Continued)

*Primary Examiner* — Bryan Lettman
(74) *Attorney, Agent, or Firm* — Fay Sharpe LLP

(57) ABSTRACT

A vacuum pump, in particular a turbomolecular pump or a multi-inlet pump, includes a rotor shaft (12) that supports at least one rotor device (14). The rotor shaft (12) is mounted on the pressure side by way of a bearing arrangement (56) and on the suction side by way of a bearing arrangement (30). The suction-side bearing arrangement (30) is disposed in a high-vacuum area (22) and includes an electromagnetic bearing. Preferably, a coil (32) of the electromagnetic bearing is disposed in a recess (38) of a housing element (40). The recess (38) is pressure-encapsulated, in particular by a tubular closure element (42).

20 Claims, 3 Drawing Sheets

(56) References Cited

FOREIGN PATENT DOCUMENTS

| | | |
|---|---|---|
| JP | 62-183246 | 8/1987 |
| JP | 64-088094 | 4/1989 |
| JP | 02-078793 | 3/1990 |
| JP | 08219086 A | 8/1996 |
| JP | 11-190294 | 7/1999 |
| JP | 11-351189 | 12/1999 |
| JP | 2000161284 * | 6/2000 ............. F04D 19/04 |
| JP | 2000161284 A | 6/2000 |
| JP | 2000-283161 | 10/2000 |
| JP | 20050025 A | 2/2005 |

* cited by examiner

VACUUM PUMP

BACKGROUND

The present invention relates to a vacuum pump, particularly a turbomolecular pump or a multi-inlet turbomolecular pump.

Turbomolecular pumps comprise at least one rotor including a rotor arrangement with a plurality of rotor disks. Between the rotor disks, stator disks are arranged, being held by stator rings. The rotor arrangement is mounted on a fast-rotating rotor shaft. Turbomolecular pumps have an inlet on the suction side and an outlet on the pressure side. On the suction-side inlet, final pressures of possibly less than $1 \cdot 10^{-10}$ mbar can be achieved. Frequently, the pressure-side pump connector has additional pre-vacuum pumps connected to it.

Multi-inlet pumps comprise at least one intermediate inlet in addition to a main inlet on the suction side. Usually, the rotor arrangement of a multi-inlet pump comprises two pump stages which can be formed e.g. as turbomolecular stages, with said intermediate inlet being arranged between these two pump stages. Often, a further pump stage, such as e.g. a Holweck stage, is provided behind the turbomolecular stages when viewed in the conveying direction. By use of multi-inlet pumps, different pressure levels can be generated at the main inlet and said at least one intermediate inlet.

Particularly in fast-rotating vacuum pumps, such as e.g. turbomolecular pumps and multi-inlet pumps, the support of the rotor shaft on the pressure side, i.e. in regions where no low pressures prevail, can be provided by means of electromagnetic bearings. In known vacuum pumps, the electromagnetic bearings provided for bearing support of the rotor shaft are operated in pressure ranges of up to 120 mbar. Further, it is known to use passive magnetic bearings for support of the rotor shaft in the high-vacuum region.

Electromagnetic bearings are not customarily used for the bearing support of a vacuum pump on the suction side, which is because of the low pressures in this region due to the circumstance that the coil bodies and sensor devices used therein are components with large surfaces and numerous cavities. Thus, because of the continuous outgassing, achieving the desired final pressure is not possible at all or is possible only with difficulties. Further, it is known to use passive magnetic bearings in the high-vacuum region.

For electromagnetic support of the whole rotor shaft, it has been proposed in DE 20 2005 019 644 to arrange the two electromagnetic bearings within a cartridge. Internally of said cartridge, the rotor shaft is arranged together with the bearings and the electric motor. In the direction of the pressure side, the cartridge is substantially open so that, within the cartridge, there will exist the atmospheric pressure or at least a relatively high pressure acting on the pressure side of the pump. The rotor shaft comprises a projection extending from out of the cartridge and carrying the rotor arrangement. Thus, the rotor arrangement is fastened to a cantilevered end of the shaft. Therefore, the constructional length of the pump is restricted. Further, the attachment of the rotor arrangement to the cantilevered shaft end will cause large forces at the bearing sites, entailing the necessity to install correspondingly complex electromagnetic bearings. Further, this constructional design is subject to massive restrictions due to the rotor-dynamic behavior, particularly because of low natural frequencies.

From U.S. Pat. No. 5,547,338, it is known to provide bearings of the type with turbulent fluidized bed. These bearings are basically different from electromagnetic bearings because bearings with turbulent fluidized bed are energized by the fields of the opposite permanent magnets. Exactly for the support of rotor shafts in turbomolecular pumps, bearing arrangements of this type are unfit for use because bearings with turbulent fluidized bed are very unstable. Further, if one were to use a bearing arrangement of this type, the ohmic losses in the conductive disks would cause a massive heat-up of the rotor until the magnetic fluxes would be sufficient for achieving the desired bearing effect. Further, this approach would cause a braking effect acting on the rotor and thus entail the need for an increased drive power.

It is an object of the invention to provide a vacuum pump, particularly a turbomolecular pump or a multi-inlet turbomolecular pump, wherein the bearing arrangements are improved.

The vacuum pump of the invention comprises a rotor shaft carrying a rotor arrangement, wherein the rotor arrangement can include, if required, a plurality of rotors or other suction or pumping devices. The rotor shaft is supported by—usually two—bearing arrangements, notably by a pressure-side bearing arrangement and a suction-side bearing arrangement. According to the invention, the suction-side bearing arrangement is arranged in a high-vacuum region and thus is exposed to low pressures. Further, according to the invention, the suction-side bearing arrangement is an electromagnetic bearing. A high vacuum is to be understood herein as a pressure below $10^{-3}$ bar, preferably less than $10^{-5}$ bar and most preferably less than $10^{-10}$ bar.

Particularly if the electromagnetic bearing is arranged in the region of very low pressures, as occurring on the suction side, i.e. in the inlet region of a turbomolecular pump, it is provided according to a particularly preferred embodiment that the coil of the electromagnetic bearing is arranged in a pressure-encapsulated recess. By arranging the coil in the pressure-encapsulated recess, it is safeguarded that the coils itself is not located directly in the high-vacuum region. This precludes the disadvantage that, due to the numerous cavities in the coil, the continuous outgassing will not or only with difficulties allow the final pressure to be reached. By the inventive provision of an electromagnetic bearing in the high-vacuum region, it is possible to support the rotor shaft in its end regions. Particularly, the rotor arrangement can be connected to the rotor shaft between the two bearings. An attachment of the rotor arrangement to a cantilevered arm of the shaft and thus a flying support of the rotor are not required anymore. Further, if also the pressure-side bearing arrangement is formed as an electromagnetic bearing, the resultant fully electromagnetic support of the shaft makes it possible to reach higher rotational speeds because the shaft can be given a very rigid design and the damping and stiffness at the bearing sites can be parametrized by software.

SUMMARY

According to a particularly preferred embodiment, the suction side is provided exclusively with an electromagnetic bearing. At the most, a safety bearing is installed in addition thereto as a matter of precaution. Herein, the bearing on the suction side can be designed to be simultaneously an electromagnetic radial bearing and an electromagnetic axial bearing, wherein the two bearing directions can be realized by two separate electromagnetic bearings. According to a particularly preferred embodiment, it is provided that the support on the suction side is exclusively a radial support realized by means of a corresponding radial electromagnetic bearing. Particularly, in this embodiment, the axial support is provided on the opposite side of the shaft, i.e. on the pressure side.

According to a particularly preferred embodiment, said recess is arranged in a housing element, i.e. preferably in a stationary element connected to the housing. Herein, an opening of the recess is preferably oriented in the direction of the rotor shaft. Preferably, the recess has a circular ring shape and fully surrounds the rotor shaft. Thus, it is possible to arrange an annular coil of an electromagnet within the recess. Preferably, herein, the electric feed lines can be guided into the recess through the housing, and not via the opening of the recess provided in the direction of the rotor shaft.

For pressure encapsulation, i.e. for sealing the recess, it would also be possible, for instance, to fill the recess with synthetic resin or the like after arranging the coil in the recess. In case of very low pressures, however, the use of synthetic resin or the like has the disadvantage that e.g. softening agents will outgas in a high vacuum, so that, for instance, the results of the analysis may be adulterated. According to a preferred embodiment of the invention, the opening of the recess is tightly closed by a preferably tubular closure element. Thus, the opening, which preferably is oriented towards the inside in the direction of the rotor shaft, can be closed in a simple manner by a tubular closure element. In case that the recess specifically has the shape of a circular cylinder, the opening of the recess corresponds to the inner circumferential surface of the circular ring-shaped cylinder. The sealing attachment of the closure element to the housing element can be performed preferably via sealing elements such as e.g. O-rings.

Depending on the given case, a pressure encapsulation of the electromagnetic bearing can be omitted. For instance, such a pressure encapsulation is not absolutely required if the pressures which are to be achieved are not too low and/or a corresponding outgassing will thus not occur or will have no adverse effects. For instance, in case of an inventive use of electromagnetic bearings in the region of intermediate inlets of multi-inlet pumps, a pressure encapsulation may possibly be omitted. Depending on the given application, e.g. when using multi-inlet pumps in mass spectrometers, a pressure encapsulation will however by advantageous for avoidance of degassing.

Preferably, the bearing arrangement on the suction side is designed exclusively as an electromagnetic radial bearing. This design offers the advantage that the encapsulation of the electromagnetic coil can be realized in a simple manner. Further, it is easier under the technical aspect if the axial support of the rotor shaft is realized on the pressure side. In this case, it is possible to use, in a simple manner, an electromagnetic axial support because the existing pressure are distinctly higher and an encapsulation of the electromagnetic coil will thus not be required. Particularly, it is possible to configure the pressure-side bearing as a radial as well as axial bearing wherein, according to a preferred embodiment, there is provided an electromagnetic combinatory bearing so that an electromagnetic bearing will provide both the axial and the radial support of the rotor shaft on the pressure side.

Further, it is advantageous if bearing sensors, provided to determine particularly the position of the rotor shaft, are also arranged within the encapsulated recess. With the aid of the bearing sensors, which preferably are connected to corresponding electronics, the control of the electromagnets will be performed.

In the inventive configuration of the support of the rotor shaft, the suction-side bearing arrangement in turbomolecular pumps having a sole inlet and one outlet is arranged immediately in the inlet region where a high vacuum prevails. Thus, the support of the rotor shaft can be realized in the end region thereof so that the rotor of the turbomolecular pump is arranged between the two bearing arrangements.

When supporting a rotor shaft of a multi-inlet pump and practicing the inventive use of an electromagnetic bearing in the high-vacuum region, the electromagnetic bearing can be arranged in the region of the main inlet where the lowermost pressure prevails. In this case, the electromagnetic bearing is preferably arranged in a pressure-encapsulated recess, as explained above.

However, in multi-inlet pumps, it is also possible to provide the suction-side bearing arrangement in the region of the intermediate inlet. In this region, which also is in a high vacuum condition, it is according to the invention possible to arrange an electromagnetic bearing. Since the pressure in the region of the intermediate vacuum inlet is higher than in the region of the main vacuum connector, it is not absolutely required to arrange the coil of the electromagnetic bearing in the pressure-encapsulated region. In this configuration, the electromagnetic bearing is thus arranged between two rotors of the rotor arrangement. This design offers the advantage that only one of the two rotors is arranged on a cantilevered end of the rotor shaft. Then, the second rotor or, if provided, a plurality of rotors or corresponding pump devices, can be arranged between the suction-side bearing and the pressure-side bearing, which preferably are both designed as electromagnetic bearings. Also by the provision of an electromagnetic bearing in the region of the intermediate vacuum connector, the total length of a multi-inlet pump can be increased. Since only one rotor and thus a smaller weight are arranged on the cantilevered end of the rotor shaft, the bearing is subjected to smaller forces than e.g. in case of a cantilevered rotor shaft as described particularly in DE 20 2005 019 644.

The invention will be explained in greater detail hereunder by way of preferred embodiments with reference to the accompanying drawings.

BRIEF DESCRIPTION OF THE DRAWINGS

The invention may take form in various components and arrangements of components, and in various steps and arrangements of steps. The drawings are only for purposes of illustrating the preferred embodiments and are not to be construed as limiting the invention.

DETAILED DESCRIPTION

Figure 1:
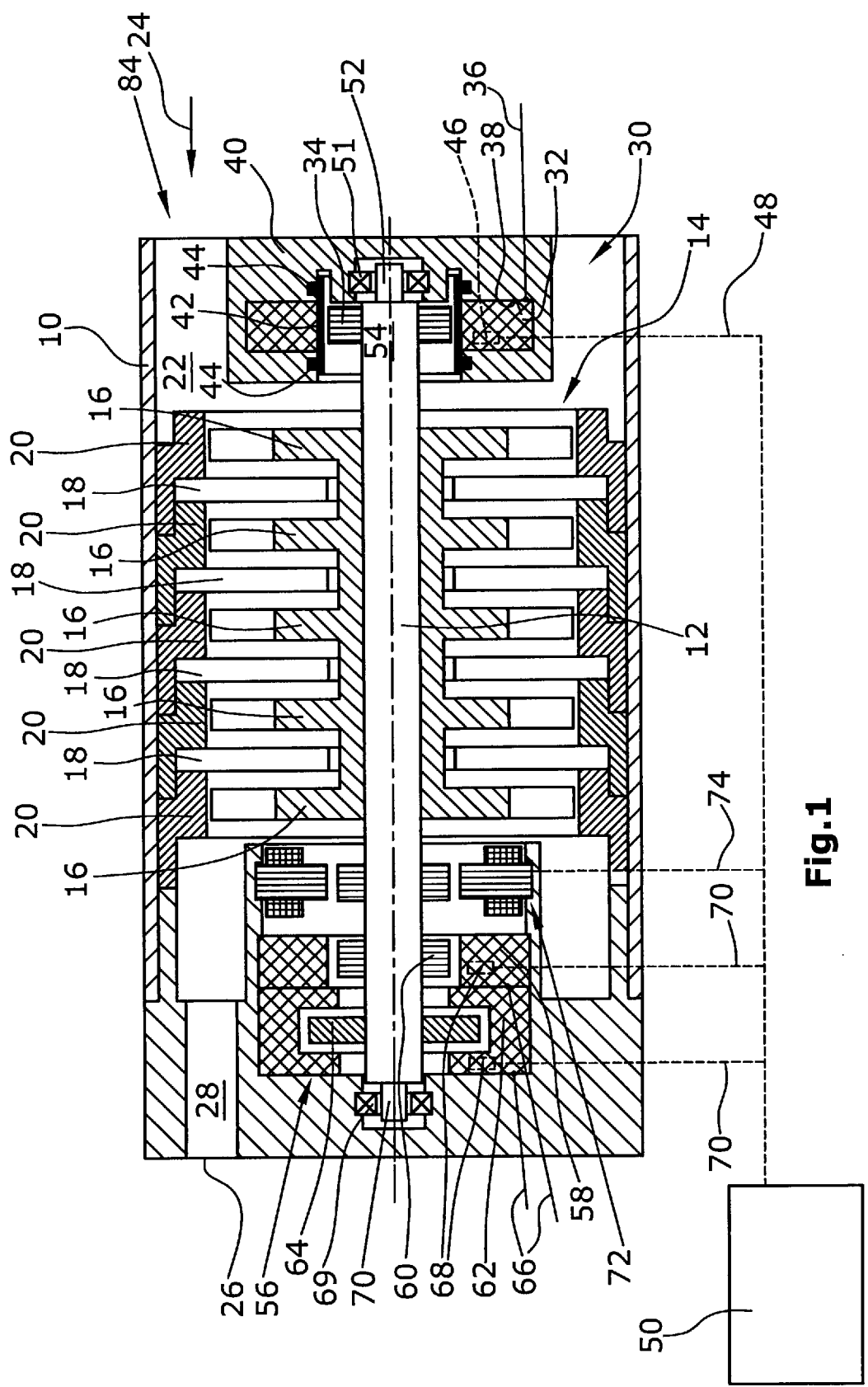
FIG. 1 is a schematic sectional view of a turbomolecular pump with a bearing arrangement according to the invention.

A turbomolecular pump as schematically shown in FIG. 1 comprises a rotor shaft 12 arranged in a housing 10. Rotor shaft 12 carries a rotor arrangement 14 which in the illustrated embodiment forms one rotor. Rotor arrangement 14 comprises a plurality of rotor disks 16. Between the rotor disks 16, stator disks 18 are arranged which are fixed by stator rings 20. A suction side 22 of the pump forms the high vacuum connector so that a medium will be sucked in the direction indicated by arrow 24. An outlet 26 of the turbomolecular pump and respectively the pressure side 28 is normally connected to a pre-vacuum pump.

According to the invention, a bearing arrangement 30 arranged on the suction side comprises an electromagnetic bearing. Said bearing comprises a coil 32 of an electromagnet and a bearing element 34 arranged for rigid rotation with rotor shaft 12 and provided e.g. in the form of so-called electric sheets. Coil 32 is connected to an electric connector 36 for energy supply. Coil 32 is arranged in a recess 38 of a housing element 40, said recess in the illustrated embodiment having the shape of a circular cylinder. Recess 38 surrounds rotor shaft 12 in an end region. Recess 38 is closed by a tubular closure element 42 as well as by sealing elements 44 preferably provided as O-rings, so that recess 38 is pressure-encapsulated. Thus, internally of recess 38, there does not exist the high vacuum prevailing in the region 22. Thereby, it is prevented that the numerous cavities existing in the coil make it difficult or even impossible to reach the final pressure.

For controlling the voltage supplied to coil 32 via line 36, at least one bearing sensor 46, schematically represented in interrupted line, is arranged within recess 38 so as to detect particularly the position of shaft 12. Via a conduit 48, the signal of bearing sensor 46 is forwarded to an electronics unit 50 which then will control particularly the level of the voltage supplied to coil 32.

Further, the illustrated suction-side bearing arrangement 30 is provided with a mechanical safety bearing 51 formed e.g. as a ball bearing. Safety bearing 51 is arranged in said housing element 40 and has a small distance from a pin 52 of shaft 12. The safety bearing substantially serves for safeguarding emergency running properties in case of fallout of the electromagnetic bearing. In the illustrated embodiment, housing element 40 is cup-shaped and surrounds a suction-side end portion 54 of rotor shaft 12.

In the illustrated embodiment, the bearing arrangement 56 provided on the pressure side 28 is also formed as an electromagnetic bearing arrangement. Provided for radial support is an electromagnetic coil 58 arranged to cooperate with a bearing element 60 which is arranged on shaft 12 and corresponds to bearing element 34. For axial support, there is provided, in the illustrated embodiment, a second electromagnetic coil 62 of U-shaped cross section which cooperates with a further bearing element (axial disk) 64 arranged on shaft 12. Said axial disk 64 extends into the recess of coil 62 so as to form an axial bearing. The two coils 58,62 each comprise an electric connection line 66. Further, the bearing arrangement is provided with position sensors 68, schematically represented in interrupted lines, for detecting the position of shaft 12 in the axial and respectively radial direction. Also said position sensors are connected, via lines 70, to said electronics unit 50 which will control the coil voltages in dependence on the sensor signals.

Corresponding to the bearing arrangement 30 comprising an electromagnetic bearing, also the bearing arrangement 36 is provided with a safety bearing 69 usually designed as a ball bearing, which surrounds a bearing pin 70 at a distance.

Rotor shaft 12 is driven by a drive means 72, usually comprising an electric motor, which, via a line 74, can also be connected to said electronics unit 50 for control.

Figure 2:
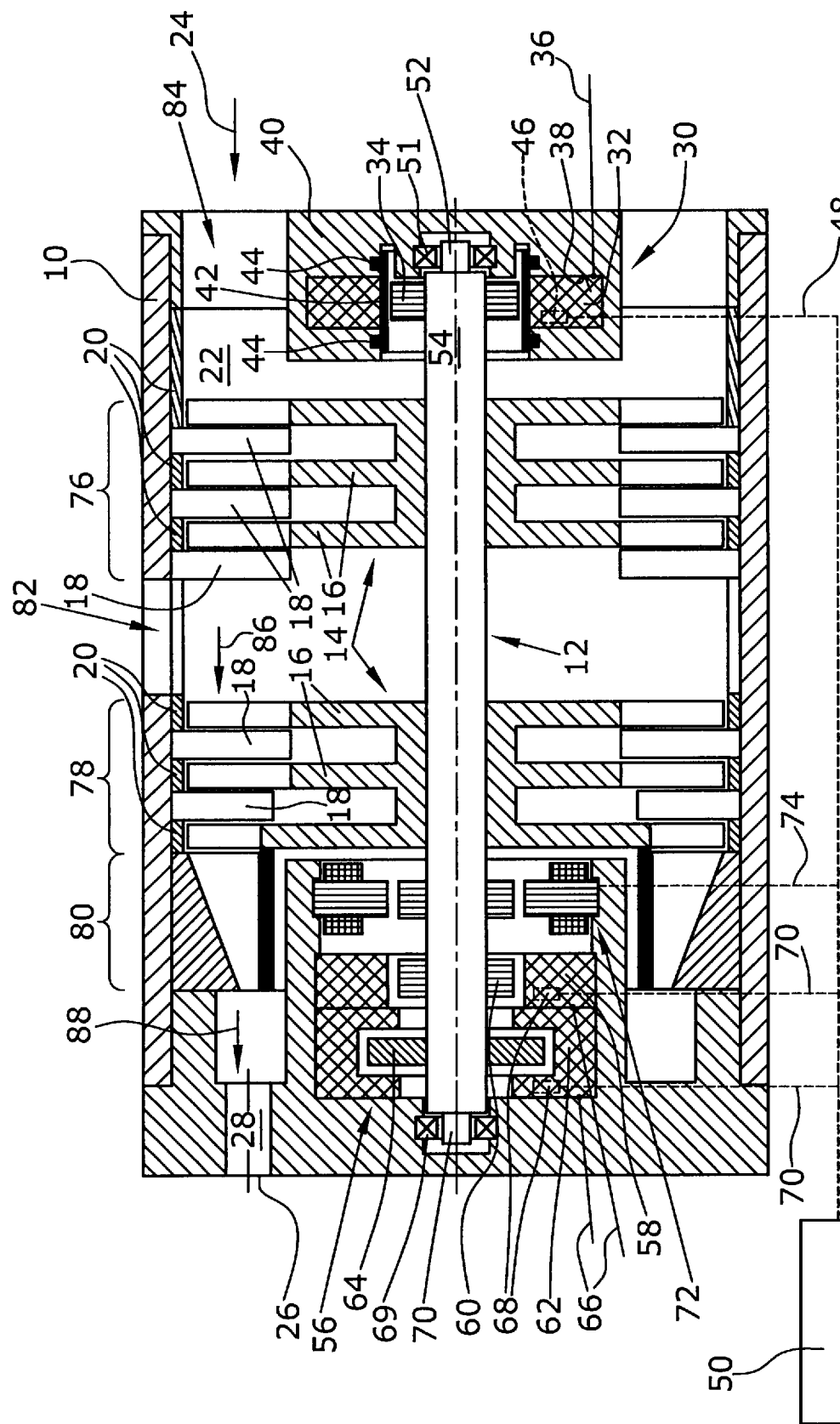
FIG. 2 is a schematic sectional view of a multi-inlet pump with a bearing arrangement according to the invention.

The schematic sectional view of FIG. 2 shows a preferred embodiment of the inventive bearing arrangement in a multi-inlet pump. The bearing arrangement 30 on the suction side and the bearing arrangement 56 on the pressure side are configured identically to those in the turbomolecular pump described with reference to FIG. 1. Identical and similar components are designated by the same reference numerals as in the turbomolecular pump (FIG. 1).

As used in a multi-inlet pump, the motor shaft 12, which again is supported in its two end regions by the bearing arrangements 30 and 56, comprises a rotor arrangement with a plurality of condenser stages 76,78,80. In the illustrated embodiment, the first two condenser stages 76,80 are turbomolecular pumps which respectively comprise a rotor 14 with rotor disks 16. Arranged between the rotor disks 16 are stator disks 18 held by stator rings 20. The two rotors 14 are arranged at a mutual distance on a rotor shaft 12. Between the two rotors 14, housing 10 is formed with an inlet opening 82 which is an intermediate inlet.

Further, the multi-inlet pump shown in FIG. 2 comprises a main inlet 84 which is the high vacuum connector. Via the main inlet, the sucked gas will flow in the direction of arrow 24. Additionally, in the region of the intermediate inlet 82, medium is sucked in via the intermediate inlet as indicated by arrow 86 and is conveyed to the left in FIG. 2.

The third condenser stage will then convey the medium in the direction of the pressure side 28 and respectively the outlet 26, as indicated by arrow 88. Outlet 26 normally has a pre-vacuum pump connected thereto.

The third condenser stage 80 can be formed e.g. by a Holweck stage or the like. Normally, via the rotor 14 depicted on the left-hand side in FIG. 2, also the rotating components of the third condenser stage are connected to the rotor shaft 12, and they are driven in common.

By the inventive configuration of the suction-side bearing arrangement 30, it is made possible to provide the two bearing arrangements 56,30 on the shaft ends, thus allowing to realize a maximum distance between the bearings.

Figure 3:
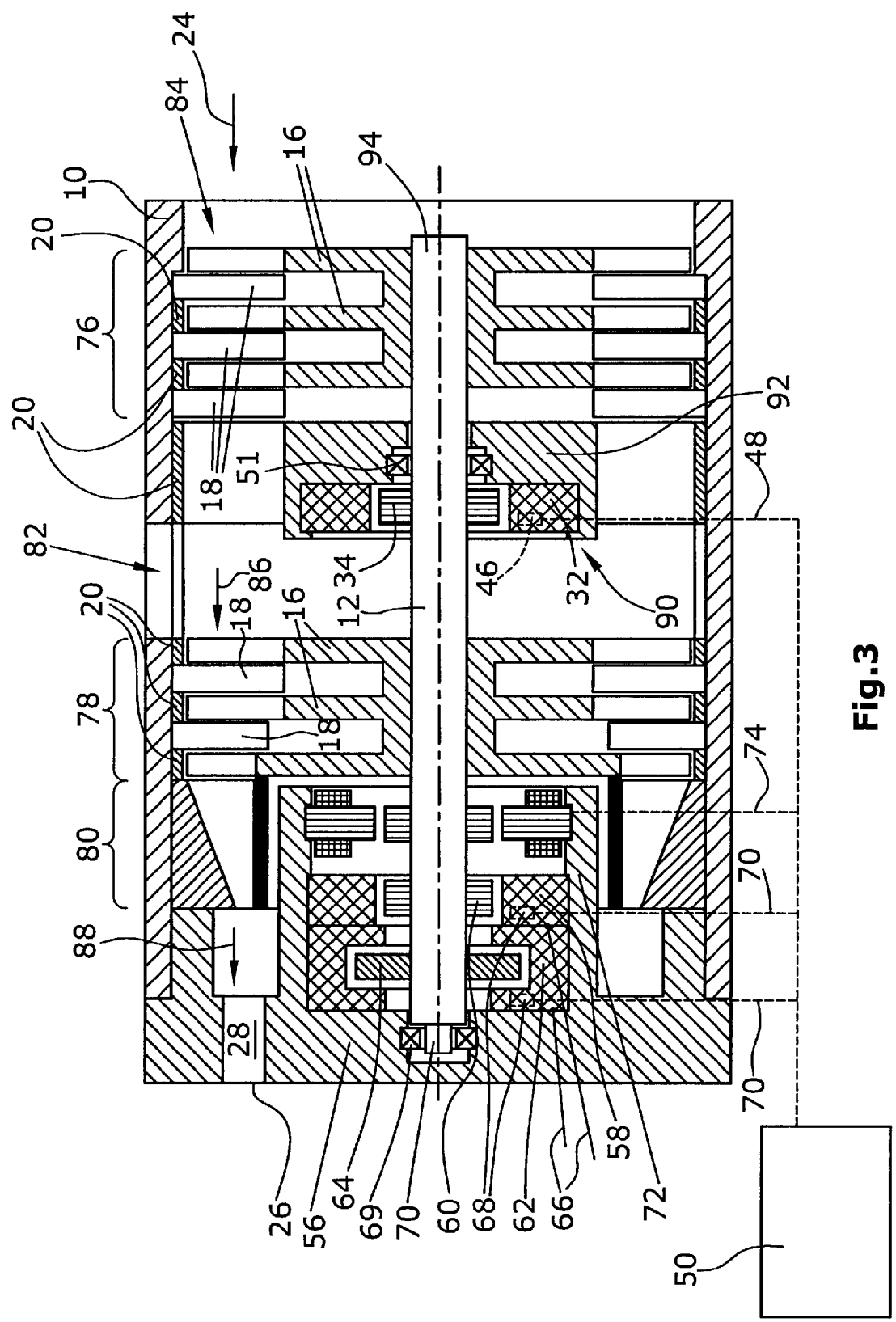
FIG. 3 is a schematic sectional view of a multi-inlet pump with an alternative bearing arrangement according to the invention.

Also the schematic sectional view of FIG. 3 shows an embodiment of a multi-inlet pump wherein, in comparison to the suction-side bearing arrangement 30 shown in FIG. 2, the suction-side bearing arrangement 90 has been relocated further inwards. Identical and similar components are again designated by the same reference numerals.

The suction-side bearing arrangement 90 is arranged in the region of the intermediate vacuum inlet 82. Although there still exists a high vacuum of e.g. $10^{-3}$ to $10^{-5}$ mbar, the placement of an electromagnetic bearing in this region does not make it necessary to arrange the coil 32 within a pressure-encapsulated recess as is the case for the bearing arrangement 30. However, it is possible to provide a pressure-encapsulated arrangement also for the coil.

In the illustrated embodiment, the coil 32 of suction-side bearing 90 is arranged in a housing element 92. Again, the coil 32 is arranged opposite to the bearing element 50 which is fixedly connected to shaft 12. Further, a sensor 46 is provided which is connected to electronics unit 50 via a line 48.

Therefore, in the embodiment of a multi-inlet pump illustrated in FIG. 3, the bearing arrangement 90 is arranged intermediate the two rotors 14. The rotor 14 connected to high-vacuum connector 84 is thus tightly connected to a freely cantilevered shaft projection 94.

The invention has been described with reference to the preferred embodiments. Modifications and alterations may occur to others upon reading and understanding the preceding detailed description. It is intended that the invention be construed as including all such modifications and alterations insofar as they come within the scope of the appended claims or the equivalents thereof.

The invention claimed is:
1. A turbomolecular vacuum pump, comprising
a rotor shaft carrying at least one rotor arrangement, and
a pressure-side bearing arrangement provided on a pressure side and a suction-side bearing arrangement provided on a suction side, for bearing support of the rotor shaft,
wherein said suction-side bearing arrangement is arranged in a high-vacuum region and comprises an electromagnetic bearing, the electromagnetic bearing including a coil arranged in a pressure-encapsulated recess, the pressure-encapsulated recess being sealed from the suction-side such that gas flow from the coil into the suction-side is prevented.

2. The vacuum pump according to claim 1, wherein a pressure of less than $10^{-5}$ mbar exists in said high-vacuum region.

3. The vacuum pump according to claim 1, wherein a pressure less than $10^{-10}$ mbar exists in said high-vacuum region.

4. The vacuum pump according to claim 1, wherein said recess is provided in a housing element.

5. The vacuum pump according to claim 1, wherein said recess has an opening which is hermetically sealed such that the flow between gas and the recess to the suction-side is prevented.

6. The vacuum pump according to claim 1, wherein said suction-side bearing arrangement is configured exclusively as a radial bearing.

7. The vacuum pump according to claim 1, further including: at least one bearing sensor arranged within said pressure-encapsulated recess.

8. The vacuum pump according to claim 1, wherein said pressure-side bearing arrangement is formed as a radial and axial bearing.

9. The vacuum pump according to claim 8, wherein the pressure-side bearing arrangement comprises an electromagnetic bearing.

10. The vacuum pump according to claim 1, wherein said electromagnetic bearing comprises a bearing element connected to the rotor shaft.

11. The vacuum pump according to claim 1, wherein said suction-side bearing arrangement is located in a region of the suction side of the whole rotor arrangement.

12. The vacuum pump according to claim 1, wherein the whole rotor arrangement is located between the two bearing arrangements.

13. The vacuum pump according claim 1, wherein said suction-side bearing arrangement is located between two rotors of the rotor arrangement.

14. The vacuum pump according to claim 1, wherein the suction side bearing arrangement is configured as a radial and axial bearing.

15. The vacuum pump according to claim 1, wherein said pressure-side bearing arrangement is formed as an electromagnetic bearing.

16. The vacuum pump according to claim 1, wherein the recess is provided in a housing element and is open in the direction of the rotor shaft.

17. The vacuum pump according to claim 1, wherein the recess has an opening which is hermetically sealed by a tubular closure element.

18. The vacuum pump according to claim 1, wherein said electromagnetic bearing each comprises a bearing element connected to the rotor shaft and a coil, the coil being hermetically sealed in the pressure encapsulated recess and the bearing element and the rotor being outside of the pressure encapsulated recess.

19. A turbomolecular vacuum pump comprising:
a housing having a suction-side inlet and a pressure-side outlet, the housing defining a bearing assembly recesses adjacent a suction-side;
a rotor shaft carrying at least one rotor;
a pressure-side bearing assembly rotatably supporting a pressure-side end of the rotor;
a suction-side bearing assembly including an electromagnetic bearing coil disposed in the bearing assembly recess and a bearing element supported on a suction-side end of the rotor shaft; and
a closure element which closes the recess and hermetically seals the electromagnetic bearing coil from the bearing element and the suction-side, such that gas is prevented from flowing from the recess to the suction-side.

20. The vacuum pump according to claim 19, wherein the closure element is cylindrical and surrounds a portion of the suction-side end of the rotor shaft.

* * * * *